United States Patent

[11] 3,544,759

| [72] | Inventor | August F. Manz<br>Union, New Jersey |
| [21] | Appl. No. | 597,980 |
| [22] | Filed | Nov. 30, 1966 |
| [45] | Patented | Dec. 1, 1970 |
| [73] | Assignee | Union Carbide Corporation<br>a corporation of New York |

[54] ELECTRIC ARC WORKING APPARATUS
4 Claims, 1 Drawing Fig.

[52] U.S. Cl. .................................................. 219/131,
336/149; 219/116
[51] Int. Cl. ...................................................... B23k 9/10
[50] Field of Search......................................... 219/131,
13(R), 116; 307/17, 12, 15, 31, 32, 83; 323/50,
54, 52; 336/149, 150; 315/254, 257, 276, 31

[56] References Cited
UNITED STATES PATENTS

| 2,652,500 | 9/1953 | Bonanno .................... | 336/149X |
| 2,785,337 | 3/1957 | Johnson ...................... | 315/257X |
| 3,041,563 | 6/1962 | Carlsen ....................... | 336/149 |
| 3,130,295 | 4/1964 | Manz........................... | 323/44X |

Primary Examiner—Joseph V. Truhe
Assistant Examiner—J. G. Smith
Attorneys—Paul A. Rose, Thomas I. O'Brien and Dominic J. Terminello ABSTRACT: An electric arc working system having a power supply connected in circuit relation with the electrode and workpiece for controlling the delivery of power to the arc under one or more welding conditions. The power supply includes a transformer and a reactance coil which has adjustable sliding contacts mounted so as not to interfere with each other thereby permitting each to be preset within the full output range of the supply. Hence two or more voltage current conditions can be independently preset for use in one or more welding systems.

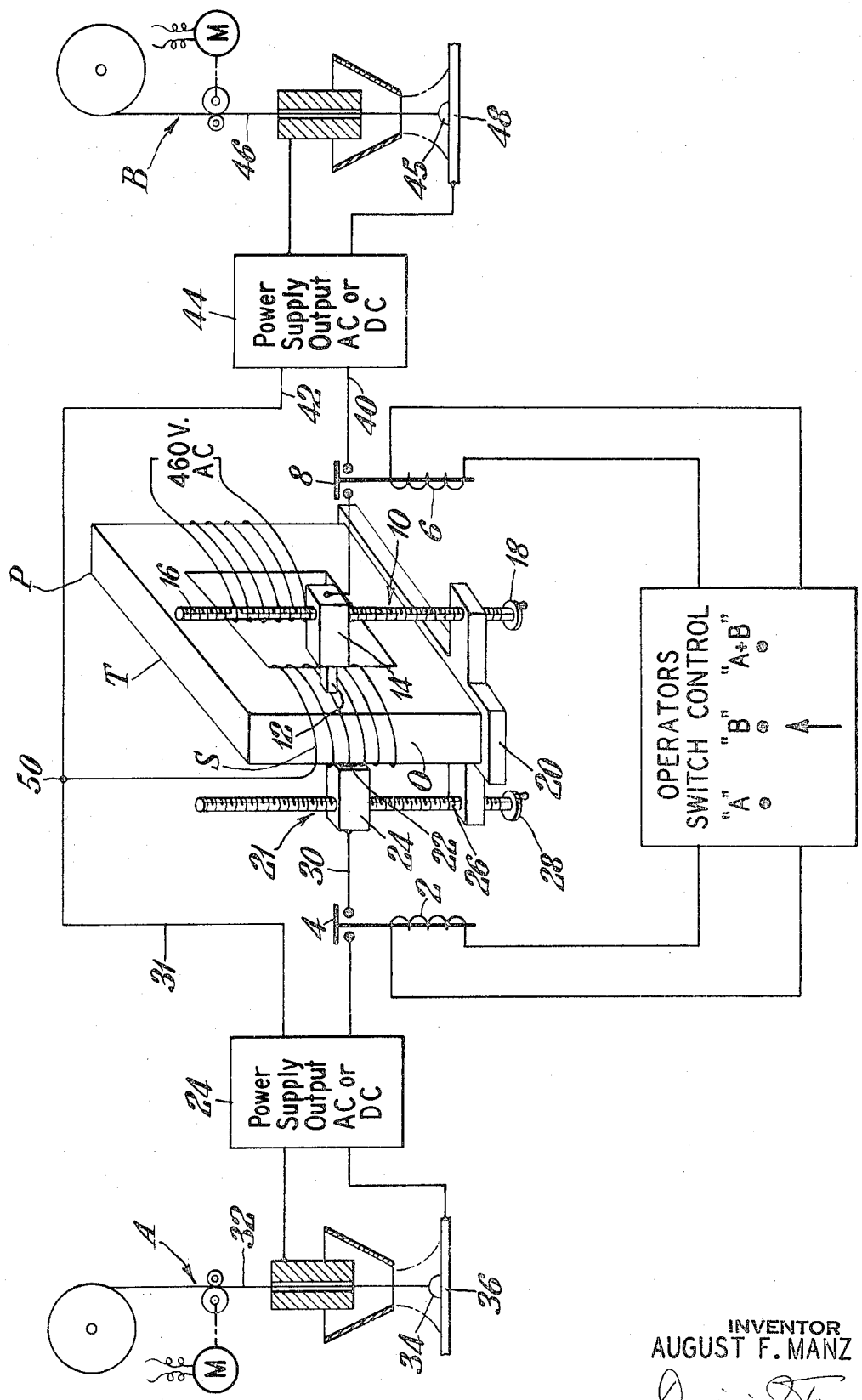

3,544,759

ELECTRIC ARC WORKING APPARATUS

This invention relates to electric arc working and more particularly to power supply systems therefor.

This invention is an improvement over the power supply system described in U.S. Pat. No. 3,130,295, dated Apr. 21, 1964 granted to A. F. Manz, the teachings of which are incorporated herein by reference. An arc welding power supply is shown therein of the type having a transformer or reactor and depending upon mechanically changing the transformer turns ratio, or reactance member windings for control of the power output of the supply.

In accordance with that disclosure, a number of electrical sliding contacts or brushes are coupled together and installed or mounted on one side or face of the transformer secondary. The brushed brushes are adjustable with respect to the transformer winding and movable independent of one another as well as in unison. The incorporation of the brushes into the power supply permits a welding operator to preset the output of the power supply to suit various different welding conditions which will arise during the welding operation. The number of arc welding voltage-current conditions which can be preset depends upon the number of brushes installed. Accordingly, should additional power supply presettings be required one need only install additional adjustable brushes. However, the more brushes that are added the smaller the output voltage-current range of each individual brush. That is, for example, where one brush only is mounted it can be slidably adjusted along the entire face or side of the transformer secondary and as such provide an output throughout the entire range of the secondary, where two brushes are mounted each may be slidably adjusted along only half the face of the transformer secondary and as such provide an output throughout only half the range of the secondary and so on continually reducing the output range for each brush as additional brushes are added. In this example the assumption has been made that the brushes should all be variable throughout an equal range. If this is not so then the setting of one brush limits the second brush to adjustment within the remaining range for the brushes are prevented mechanically from crossover. Therefore, should a first condition exist at the arc during the welding operation which requires more than one-half of the entire output of the power supply then such first condition cannot be preset by the teachings of the invention referred to hereinabove when a second condition mechanically limits the first condition.

The present invention is directed at overcoming this disadvantage and in addition in providing a power supply which has increased versatility and flexibility in that it can supply more than one independent output adaptable for different welding conditions, or for controlling the power requirements for more than one welding system concurrently.

According, this invention permits a welding operator to preset two or more voltage-current conditions, which are independent of one another, throughout the entire range of the power supply for use in one or more welding systems.

It is an object of this invention to provide an arc power supply in which two or more arc working voltage-current conditions can be preset within the full output range of the supply.

It is a further object of this invention to provide an arc power supply which can supply more than one independent output individually or concurrently.

These and other objects and advantages of the invention will be pointed out and become apparent from the following detailed description thereof in connection with the accompanying drawing in which:

The sole FIG. is a schematic diagram with parts shown in perspective of two welding systems connected in circuit with a common power supply illustrative of the invention.

Power supplies for supplying energy to the weld are of the generator or transformer type. We are concerned her exclusively with the latter type where control is achieved through a change in the turns ratio. The power supply may be a.c. energized and consist solely of a transformer or reactor or combination with or without an accompanying rectifier or be d.c. energized consisting solely of an inductor.

Referring now to the drawing there is provided a dual welding system having a common power supply. The power supply is operatively controlled through the welding operators switch control which makes the power supply selectively available to either welding system A or welding system B or both welding systems concurrently. The power supply system comprises an a.c. power transformer T having a primary winding P and a secondary winding S. The primary is connected to a 460 volt power source in the case of single phase operation. If three phase operation is employed the transformer would of course be of a three phase type. The transformer is a step down transformer with a secondary of high current capacity and is shown schematically as having two legs with the secondary winding S wound around the leg 0. The leg 0 schematically defines four faces or sides each side exposing the portion of the secondary winding wrapped thereon. Each portion of the secondary winding lying on a separate leg side or face is hereinafter defined as, and will be referred to as, a coil side; the leg 0 of FIG. 1 thus possessing four coil sides. The invention is not limited to a coil of four sides, any number of sides, two or more, is appropriate.

The term coils is used herein to include a.c. energized coils as well as d.c. inductors.

On one coil side is mounted a sliding brush assembly 10 having an adjustable sliding brush 12 in electrical contact with the secondary winding S. The sliding brush 12 is provided with a holder 14 of insulating material threaded to an adjusting screw 16 which is affixed to handle 18 carried by frame 20. When the handle 18 is rotated, the brush holder 14 rides vertically up or down the screw perpendicular to secondary winding S. Thus, sliding brush 12 may be positioned and preset at any point along the side of the secondary winding S upon which it is mounted.

On another coil side, shown in the drawing on the opposite side for convenience, is mounted a second sliding brush assembly 21 having an adjustable sliding brush 22 in electrical contact with the secondary winding S. The sliding brush 22 is provided with a holder 24 of insulating material threaded to an adjusting screw 26 which is affixed to handle 28 carried by frame 20. When the handle 28 is rotated the brush holder 24 rides vertically up or down the screw perpendicular to secondary winding S. Thus sliding brush 22 may be positioned and preset at any point along the side of the secondary winding S upon which it is mounted.

Accordingly, each brush provides an output with respect to common terminal 50 which is independent of the other. Although not shown, a third electrical brush assembly may be installed on a third side of the coil providing yet a third brush output with respect to common terminal 50 and independent of the other brush outputs.

Power is supplied to welding system A through power supply output 24 upon energizing relay 2 from the operators switch control by placing it in the A position. The energization of relay 2 closes normally open contact 4 completing a circuit from conductor 30, sliding brush 22, secondary winding S, conductor 31 and power supply output 24. The position of sliding brush 22 defines the turns ratio between the primary and secondary windings for welding system A and therefore determines the voltage across conductors 30 and 31 and in turn the power supplied to arc 34 between the end of electrode 32 and work 36. Sliding brush 22 is preset by rotation of handle 28, to a proper output setting to suit the welding condition of welding system A. If more than one welding condition will be employed in welding system A additional brushes may be fitted upon the adjusting screw 26 as taught in U.S. Pat No 3,130,295 referred to hereinbefore.

Power is supplied to welding system B through power supply output 44 upon energizing relay 6 from the operators switch control by placing it in the B position. The energization of relay 6 closes normally open contact 8 completing a circuit from conductor 40, sliding brush 12, secondary winding S, conductor 42 and power supply output 44. The position of sliding brush 12 defines the turns ratio between the primary and secondary windings for welding system B and in turn the power supplied to arc 45 between the end of electrode 46 and work 48. Sliding brush 12 is preset manually, by rotation of handle 18, to a proper output setting to suit the welding condition of welding system B.

The power supply may be used by two welding operators upon two independent welding systems requiring different welding conditions simultaneously. When the operators switch control is placed in the A+B position relays 2 and 6 are both energized completing the circuit to power supply output 24 through sliding brush 30 and completing the circuit to power supply output 44 through sliding brush 12. The systems therefore operate in parallel, independently of one another, from the same transformer source.

While the invention is shown directed at two welding systems operated independently or concurrently using two brush arrangements it is not limited to only two brush arrangements nor do the brush arrangements have to be applied to independent welding systems. It also contemplates using the brushes in common to set two or more different welding conditions simultaneously for a single welding system.

The invention also is applied to arc arc-working systems as well as arc-welding systems.

In addition, although the invention is described with reference to voltage controlled or constant potential-type power supplies it is equally applicable to current controlled or conventional-type power supplies. For current control the sliding brushes are mounted on different coil sides in the same manner as in voltage control, but are connected in circuit so that adjustment of the brushes change the magnetic flux linking the coil affecting only the output current, the open circuit voltage remaining fixed.

I claim:

1. In an arc-welding system requiring different volt-ampere conditions therefor, means for generating a welding arc, an a.c. energized power supply circuit for energizing the arc with a plurality of preselected volt-ampere conditions having a minimum current rating of over at least 50 amperes, means for selectively operating said a.c. energized power supply circuit to produce any one of such conditions, the improvement wherein said power supply circuit comprises an a.c. energized coil provided with a plurality of adjustable sliding brush taps located on the same side of the coil but on different faces thereof for setting such conditions without physical interference from one another, and means for individually adjusting said taps with respect to such coil.

2. A system as defined in claim 1 in which said coil comprises a reactance.

3. A system as defined by claim 1 in which said coil comprises a transformer having a primary and secondary and wherein the plurality of adjustable taps are located on the secondary side thereof.

4. In a electric arc-welding system having a power supply capable of supplying over at least 50 amperes of current said power supply being in circuit with an electrode and workpiece for controlling the delivery of power to an arc established between said electrode and workpiece under one or more different welding conditions, the improvement wherein said welding supply comprises a transformer having a primary and secondary, a plurality of independently variable sliding brushes mounted in common on the secondary side of the transformer but on different faces thereof such that each sliding brush is capable of providing an output within the entire output range of the power supply.